United States Patent
Jordan et al.

(10) Patent No.: US 11,461,582 B2
(45) Date of Patent: Oct. 4, 2022

(54) AUTHENTICATION MACHINE LEARNING FROM MULTIPLE DIGITAL PRESENTATIONS

(71) Applicant: ALPVISION S.A., Vevey (CH)

(72) Inventors: Frederic Jordan, Vevey (CH); Nicolas Rudaz, Vevey (CH); Yves Delacretaz, Vevey (CH); Martin Kutter, Vevey (CH)

(73) Assignee: ALPVISION S.A., Vevey (CH)

( * ) Notice: Subject to any disclaimer, the term of this patent is extended or adjusted under 35 U.S.C. 154(b) by 150 days.

(21) Appl. No.: 16/956,028

(22) PCT Filed: Dec. 20, 2018

(86) PCT No.: PCT/EP2018/086442
§ 371 (c)(1),
(2) Date: Jun. 19, 2020

(87) PCT Pub. No.: WO2019/122271
PCT Pub. Date: Jun. 27, 2019

(65) Prior Publication Data
US 2020/0342259 A1     Oct. 29, 2020

Related U.S. Application Data

(60) Provisional application No. 62/608,352, filed on Dec. 20, 2017.

(51) Int. Cl.
*G06K 9/62* (2022.01)
*G06T 7/70* (2017.01)

(52) U.S. Cl.
CPC ......... *G06K 9/6227* (2013.01); *G06K 9/6229* (2013.01); *G06K 9/6256* (2013.01);
(Continued)

(58) Field of Classification Search
CPC .. G06K 9/6227; G06K 9/6229; G06K 9/6256; G06K 9/6267; G06K 9/62; G06K 9/6228; G06T 7/70; G06T 2207/20081
(Continued)

(56) References Cited

U.S. PATENT DOCUMENTS

| | | | |
|---|---|---|---|
| 2004/0247169 A1 | 12/2004 | Ross et al. | |
| 2014/0073977 A1* | 3/2014 | Grady | A61B 5/021 600/504 |
| 2015/0019460 A1* | 1/2015 | Simard | H04L 1/0079 706/11 |
| 2015/0042805 A1* | 2/2015 | Okumura | B60R 11/04 348/148 |

(Continued)

FOREIGN PATENT DOCUMENTS

| | | |
|---|---|---|
| EP | 1 484 719 | 12/2004 |
| EP | 3 242 239 | 11/2017 |
| WO | WO 2015/0157526 | 10/2015 |

OTHER PUBLICATIONS

Czyz et al., "Decision Fusion for Face Authentication", Biometric Authentication, pp. 686-693, Jul. 15, 2004.

(Continued)

*Primary Examiner* — Jerome Grant, II
(74) *Attorney, Agent, or Firm* — DLA Piper LLP US

(57) ABSTRACT

A machine learning system may automatically produce classifier algorithms and configuration parameters by selecting them into a set of predetermined unitary algorithms and associated parametrization values. Multiple digital representations of input object items may be produced by varying the position and orientation of the object to be classified and/or of the sensor to capture a digital representation of the object, and/or by varying a physical environment parameter which changes the digital representation capture of the object by the sensor. A robot arm or a conveyor may vary the object and/or the sensor positions and orientations. The machine learning system may employ generic programming to facilitate the production of classifiers suitable for the classification of multiple digital representations of input object items.

(Continued)

The machine learning system may automatically generate reference template signals as configuration parameters for the unitary algorithms to facilitate the production of classifiers suitable for the classification of multiple digital representations of input object items.

12 Claims, 11 Drawing Sheets

(52) U.S. Cl.
CPC .............. *G06K 9/6267* (2013.01); *G06T 7/70* (2017.01); *G06T 2207/20081* (2013.01)

(58) Field of Classification Search
USPC ........................................................ 382/157
See application file for complete search history.

(56) References Cited

U.S. PATENT DOCUMENTS

| | | | |
|---|---|---|---|
| 2015/0161466 A1* | 6/2015 | Welinder | G06T 11/60 382/195 |
| 2017/0032285 A1 | 2/2017 | Sharma et al. | |
| 2019/0266476 A1* | 8/2019 | Schorn | G06N 3/063 |

OTHER PUBLICATIONS

Dittimi et al., "Mobile App for Detection of Counterfeit Banknotes", Proc. Int. Conf. Adv. Biometrics, pp. 156-158, Apr. 6, 2018.
Mecademic Programming manual, p. 50, May 11, 2018,.
Tax, D., "One-class classification", ISBN, pp. 202, (2001).
Written Opinion issued in PCT/EP2018/086442 dated Apr. 4, 2019.
International Search Report issued in PCT/EP2018/086442 dated Apr. 4, 2019.

* cited by examiner

AUTHENTICATION MACHINE LEARNING FROM MULTIPLE DIGITAL PRESENTATIONS

CROSS REFERENCE TO RELATED APPLICATIONS

This application is a U.S. National Stage Application of International Application No. PCT/EP2018/086442 filed Dec. 20, 2018, which claims priority from U.S. Application No. 62/608,352 filed Dec. 20, 2017. The entirety of all the above-listed applications are incorporated herein by reference.

TECHNICAL FIELD

The present disclosure relates to machine learning systems, methods and processes in the field of anti-counterfeiting and authentication of manufactured items, products, security documents and banknotes.

BACKGROUND

In order to determine whether product items are genuine, various anti-counterfeiting technologies may be used. In general, these technologies add an element onto the item that is difficult to duplicate, or copy. The challenge may be either technical, for instance on the reproduction of holograms, or require products which are not readily available on the market, such as rare isotopes or special inks. In general, anti-counterfeiting features may be classified into level 1 overt (visible, or more generally perceptible by the end user with his own body senses, without the need for specific detection equipment) or level 2 covert (invisible/imperceptible, but detectable with a dedicated equipment) features.

Visible features are elements such as:
Security Holograms: The holograms may feature realistic holographic effects, or use some pseudo-holographic effects together with colour shifts.
Optical Variable Device (OVD), Optical Variable Inks (OVI): These features are made in such a way that they change appearance under different viewing angles or different lighting conditions.
Watermarks: usually used in security papers and bank notes, watermarks were historically produced by thinning the paper at certain locations. This change creates a contrast on the paper when held up against a light source.
Intaglio: this technology is present on most banknotes. With visible watermarks, the relief of the intaglio printing is one of the features that end users can easily check on banknotes without special equipment.
Security Threads: Metallic treads or bands inlayed in paper during production of the paper. The metallic surface often features holographic or colour shifting effects, for example through refraction and interference.
Micro-perforation, or micro-perf: Often used in banknotes, micro-perf consists in small making small holes into the paper. When held against a light source, the light shines through the tiny holes and makes them visible. Very often the face value of a bank note is repeated using micro-perf.
Special paper: an example is the special cotton paper as used for example for the Euro banknotes. When gently wrinkled by the end user, the noise produced by the wrinkling sounds significantly different from a more conventional cellulose paper.

Invisible security features include elements such as:
Digital overt markings: Technologies such as digital watermarks have been designed to better prevent the counterfeiting of product packages and security documents by electronic and digital means. As a widely deployed example of such a technology, the AlpVision Cryptoglyph exists in two flavors, either as a random or pseudo-random pattern of microdots printed with visible ink, or as a distributed cloud of micro-holes in the varnish layer. The distribution of microdots or microholes can be controlled with a secret cryptographic key. Authentication can be performed using imaging devices and dedicated software applications, such as smartphones or off-the-shelf office scanners.
Surface fingerprints: These technologies do not add any security element on the product, but rather use existing, intrinsic microscopic surface characteristics. For instance, a matte surface of a plastic injected product is an ideal candidate for the fingerprint solution. An image of the surface may be acquired during production and then compared to a later image capture from the product under inspection. Authentication can be performed using imaging devices and dedicated software applications, such as smartphones or off-the-shelf office scanners.
Invisible Ink: These special inks are invisible but become visible when exposed to the appropriate light source. A well-known example is UV (Ultra-Violet) or IR (Infra-Red) inks.
Chemical Taggants: A large number of chemical taggants exist. In general, these taggants are invisible and detectable in laboratory conditions. Taggants are considered as highly secure, but not very practical and expensive.
Micro-graphics: The artwork can be secured by adding very small graphical elements which are not visible without visual magnification. Micro-text is one of the most popular realizations of this security feature.

In practice, certain products requiring a higher level of security against counterfeiting, such as banknotes or luxury item packages, typically embed a combination of multiple complementary anti-counterfeiting solutions. Moreover, to authenticate the genuine products and differentiate them from their counterfeited copies, experts such as custom officers or bank employees are specifically trained to identify a number of different features by manipulating and closely observing the object to authenticate, sometimes with visual improvement equipment such as magnifiers, UV lights, or microscopes. This manual evaluation inherently involves the human brain natural capacity to recognize and classify objects from multiple sensorial inputs and more particularly the dominant visual system sensing, image recognition and learning capabilities of humans. However, human counterfeiters have the same capabilities and also use them to similarly learn about the differentiating features to better mimic them.

As an alternative to human detection for faster authentication processing, for instance in ATM (Automated Teller Machines) and more generally dedicated banknote verification machines available to commercial banks, specific acquisition devices, such as coherent light beamers, magnifiers or special optical accessories in combination with pattern recognition techniques have been developed to automatize the detection and classification into genuine versus counterfeit banknotes. An example of such an automated currency validation and authentication system is disclosed in EP1484719 by NCR. Genuine banknote images are captured with a scanner in predetermined imaging conditions of up to 4 colours. The resulting numerical representations of the images are further partitioned into a plurality of segments with a predetermined grid. Each segment may be analysed with a statistical classifier, with a threshold for the reference classification parameter associated with the segment, so that a template can be optimized to classify the imaged banknotes as fake or genuine. The selection of a preferred number of segments or combination of segments and of an optimized classifier combination set may be automated by means of a stochastic algorithm such as a genetic algorithm (GA). This method facilitates the automation of banknote authentication template production and parametrization suitable for different central banks as the national currency banknotes typically embed different features. This method however assumes that a predetermined imaging method is used so that the predetermined grid may be applied, both at the machine learning time of producing and optimizing the template and at the detection time of capturing and classifying the banknote. This assumption is possible in the specific application of an ATM or specialized bank equipment device to classify the banknotes, but not in the case of a handheld authentication for instance by imaging a banknote with a smartphone camera. Indeed, in this un-mastered physical environment, the diversity of possible position, orientation and lighting parameters result in a diversity of digital representations of the same banknote, so that the statistical classifiers need to operate in a significantly broader search space.

WO2015157526 by Entrupy discloses an authentication system using a convolutional neural network (CNN), a support vector machine (SVM), anomaly detection techniques or a combination thereof as a classifier on low, mid and high-level microscopic variations and features. The image is split in smaller chunks to aid in processing microscopic variations (object fingerprints), building the visual vocabulary and accounting for minor variations. When CNN are used, in order to avoid overfitting of the model, the size of the data set may be artificially increased by artificially creating variations of the acquired images such as rotations, translations and cropping. However, these variations are still directly derived from the predetermined, fixed initial capture conditions and cannot represent the diversity of possible position, orientation and lighting parameters in an un-mastered physical environment such as the use of a handheld device to authenticate the product.

EP3242239 by Scantrust describes an authentication process and system which aims at distinguishing between original and copies of products printed with an overt marking, such as a barcode, with increased reliability, that is by reducing false negatives and false positive detections by means of a machine learning solution which automatically selects and adjusts the parameters and algorithmic steps of the authentication method. Similar to the NCR and Entrupy disclosures, the image may be split into subunit segments corresponding to a predetermined grid or a random grid of variable size and shape and features may be extracted accordingly. Another sub-process may consist in filtering the template image to facilitate the extraction of relevant features for the classification. A further sub-process may include a domain transform such as the Fourier transform of the subunit image blocks. The images may be acquired with a smartphone camera or with a more sophisticated sensor also supporting infrared or ultraviolet lights, as embedded in certain cameras for military purpose. As the classification failure may result from the capture conditions at the detection time being too different from the initial capture conditions used in training the automated authentication system, the end user is asked to repeat the capture in a number of trials with certain guidelines, for instance by keeping the product position within a predetermined range relative to the smartphone position. The authentication system concludes on a fake (counterfeit copy) classification of the product overt marking only after a certain number of the end user trials have failed to authenticate it as genuine. As will be apparent to those practicing authentication detection, such as custom officers, brand owner representatives and end user customers, this process is cumbersome and time-consuming.

There is therefore a need for novel automation solutions for authentication systems and processes that provide the following advantages:

Flexible/adaptive to a diversity of anti-counterfeiting features, possibly evolving over time;
Not requiring manual configuration, parametrization or programming of the classification engine;
Enabling fast and reliable detection with off-the-shelf imaging devices such as smartphones without requiring dedicated hardware extensions and without requiring to end user to replicate specific capture environment conditions.

BRIEF SUMMARY

In order to efficiently discriminate genuine items from fake items, it is proposed a computer-implemented method for producing, with at least one processor, the computing language software code and data parameters of an automated classifier of objects for authentication purposes, the method comprising:

obtaining a first set of object items for training the classifier;
obtaining a set of unitary digital representation processing algorithms and for each unitary digital representation processing algorithm, obtaining a set of configuration parameters suitable for parametrizing the execution of this digital signal processing algorithm;
acquiring, with at least one sensor, a plurality of digital signal representations of each object item in the first set, each of the plurality of digital signal representations being acquired for a predetermined object item position and orientation, for at least one predetermined sensor position and orientation, and for at least one predetermined physical environment parameter, such that the value of the physical environment parameter changes the digital signal representation of the object item at the predetermined object position and orientation and at the predetermined sensor position and orientation;
selecting, with the at least one processor, at least one unitary digital signal processing algorithm in the set of unitary digital representation processing algorithms, and configuring at least one parameter in the set of configuration parameters for this algorithm, to produce an automated classifier to classify the digital representations of further objects as similar or different from the first set of object items.

SHORT DESCRIPTION OF THE FIGURES

FIG. 1 depicts an end to end machine learning system which can be automatically trained to classify physical objects as fake or genuine by capturing a digital representation of each training input object in respective training sets of fake objects and of genuine objects, to produce an artificial intelligence generated program software code and configuration parameters to properly classify each test input object in respective test sets of fake objects and of genuine objects.

DETAILED DESCRIPTION

Training Items

Figure 1:
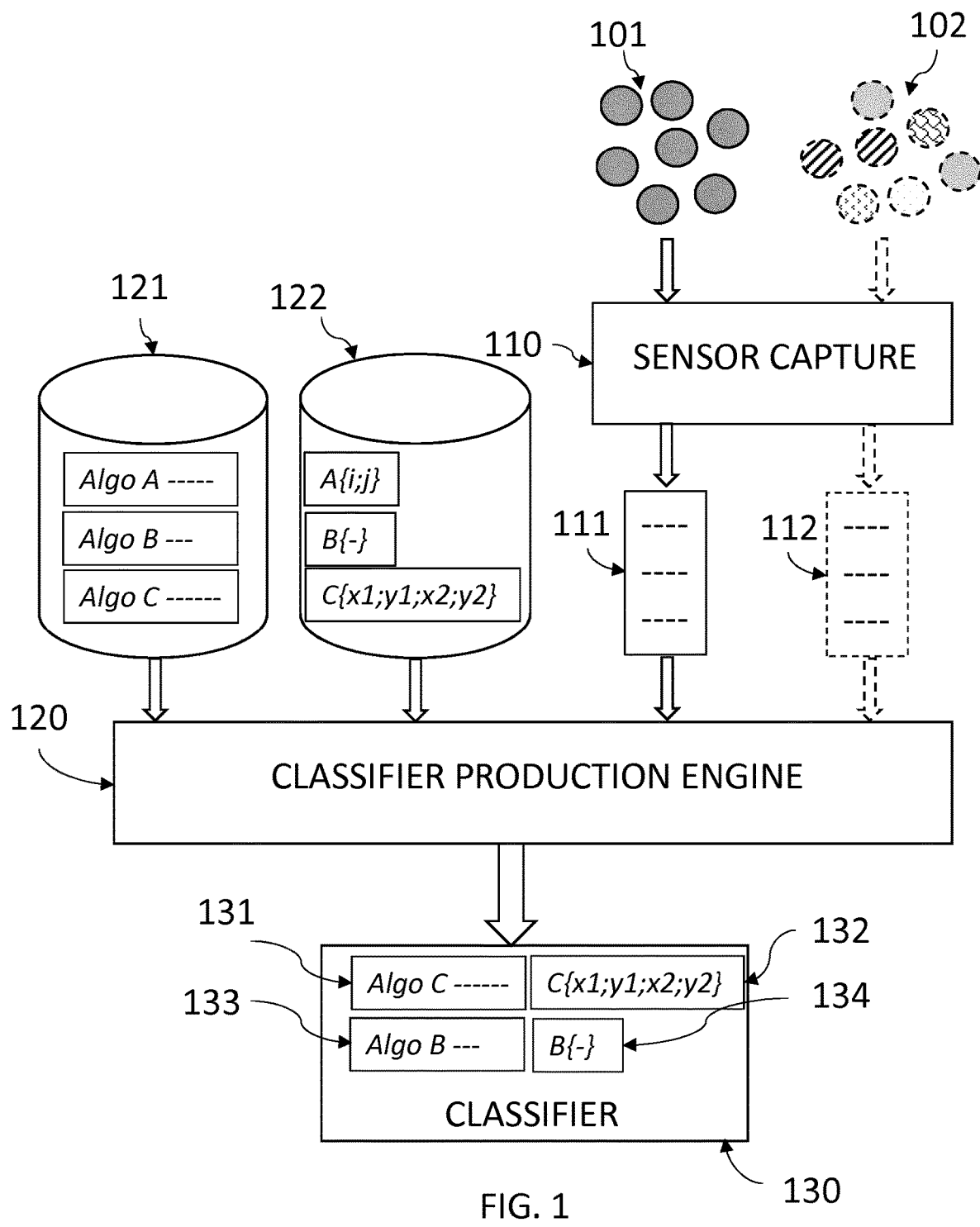
Figure 2:
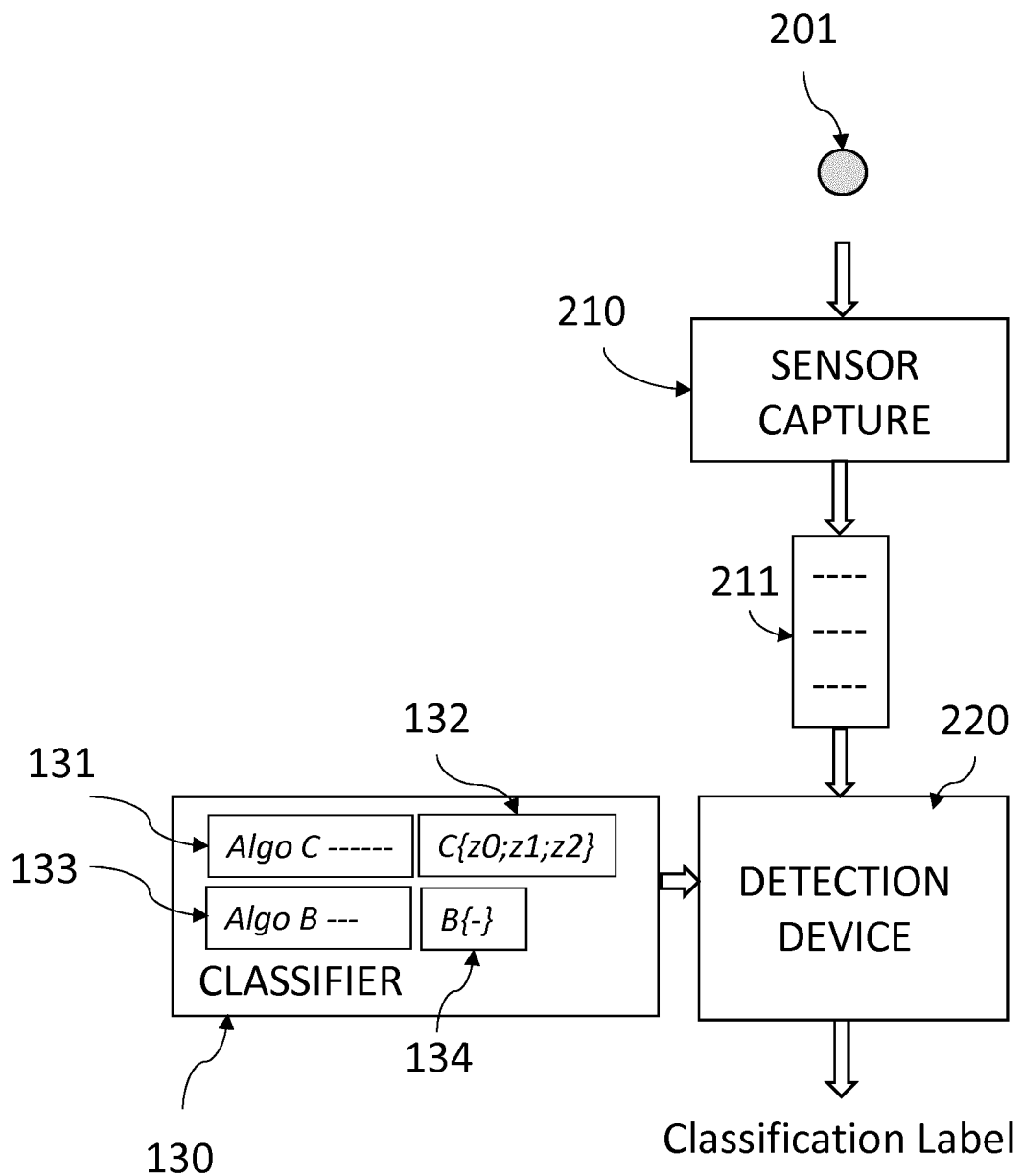
FIG. 2 depicts a prior art detection system which authenticates a real object by imaging it and classifying it with a selection of software algorithms and associated configuration parameters to detect whether it is a genuine or a fake object.

As known to those skilled in the art of machine learning, the proposed machine learning system may use as inputs respectively a set of genuine items and/or a set of fake items. Each item is labelled with its proper classification, that is genuine or fake. The set of fake items may be issued from anti-counterfeiting seizures, as regularly practiced for instance by custom officers for brand owners.

In a possible embodiment, the set of genuine items and/or the set of fake items may be further classified into subsets of originals, for instance different versions of the product or the banknote embedding different quality materials and/or different overt and covert security features. Each subset may thus be labelled with its proper classification.

In a possible embodiment, the set of genuine items and/or the set of fake items evolves over time, for instance as different versions of the product or the banknote embedding different quality materials and/or different overt and covert security features are introduced into the market, and the machine learning is regularly trained to produce classifier algorithms and configuration parameters which are adapted to properly classify the new items as well as the old ones. As will be apparent to those skilled in the art of machine learning systems, prior art partial memory learners (PML) systems may be used to this end as they are less susceptible to overtraining than conventional machine learning systems in the presence of changing or drifting learning inputs, but other embodiments are also possible.

In a possible embodiment, only genuine items are input to the learning system and the learning system is specifically trained to produce an automated classifier to classify future input outlier items as fake ones. As will be apparent to those skilled in the art of machine learning systems, one-class classification or unary classification systems as described for instance by D. M. J. Tax in One-class classification, PhD Thesis, University of Delft, 2001, the Spy-EM or the LPU (Learning from Positive and Unlabelled Data) algorithms, or more generally Self-Taught Learning frameworks may be used to this end, but other embodiments are also possible.

Digital Representations of Training Items

As the items are physical objects in the real, physical environment, while machine learning systems operate with abstract, digital representations, a first step in the proposed training system consists in capturing, with at least one sensor, at least one digital representation of each input training item. In a preferred embodiment, the sensor is a camera and the digital representation is a binary image. In another possible embodiment, the sensor is a microphone and the digital representation is a digital sound record. The sensor may be integrated into a dedicated equipment such as a production line quality control camera, or it may be integrated into a handheld device such as a smartphone, a digital camera, a camcorder, or a head-mounted device such as a VR recording headset, a GoPro helmet camera or Google glasses. Depending on the need of the authentication applications, more specialized sensors may also be used, such as an UV light sensor in combination with an UV lamp illumination of the object item, an infrared sensor in combination with an infrared lamp illumination of the object item, a magnetic sensor, a chemical sensor, a weight sensor, a laser sensor for surface measurement, etc.

Depending on the characteristics of the sensor output signals, different digital representations with different qualities and/or in different formats may be captured. Different settings may also be applied to the sensor, for example the resolution for a camera, aperture, zoom, or the frequency range for a microphone. In prior art authentication systems, regardless of whether manually programmed or trained with machine learning methods, typically one digital representation is captured for each input item and pre-processed to fit into the authentication classifier, for instance by predefining a template grid, different resolution scales, a specific position and orientation of the object lying on a flat surface, and/or specific lighting conditions. The narrowest the input digital representation space, the easiest the design of the authentication classifier, but the most cumbersome the end user manipulation as a similar digital representation space must be available at detection time for the classifier to operate. In order to overcome this limitation, in a preferred embodiment it is proposed to capture multiple digital representations of each input training item, so that the machine learning engine will be trained to produce a runtime automated authentication classifier suitable to process as diverse as reasonably foreseen possible capture conditions. The resulting produced classifier engine algorithms and configuration parameters will thus be inherently robust to a diversity of capture conditions at detection time.

In the most general case, there are three different variables in the physical environment parameters which may impact the digital representation signal of a physical item as captured with at least one sensor:

- The position and orientation of the object in the 3-dimensional space, which can be modelled with up to 6 variables corresponding to the translational and angular degrees of freedom for a rigid object body; for flexible objects (like banknotes, textiles, etc. . . . ) the position and orientation may be further modelled from the position and/or orientations of vertices over a warping grid.
- The position and orientation of the sensor in the 3-dimensional space, which can be modelled with up to 6 variables corresponding to the translational and angular degrees of freedom for a rigid object body, either as an absolute value in space or as a difference value relative to the object to be sensed;
- Certain variations in the physical environment which may directly impact the sensor capture, such as for instance the lighting conditions (position, intensity, direction, spectrum of each light, ambient lighting, presence of smoke, etc) for image sensors or the ambient noise conditions for audio sensors.

Depending on the actual applications, various system setups may be used to control, with an object positioner, at least one variable position and/or orientation parameter for the training item at capture time. In a possible embodiment, a mechanical setup with an automation control may be used, such as a robot arm or a conveyor with their software controllers, to precisely manipulate the training item and control the training item variable position and/or orientation parameter. In another possible embodiment, the training item may be placed in a fixed position and orientation and at least one other variable (such as the sensor position) in the physical environment around the training item may be varied.

Depending on the actual applications, various system setups may be used to control, with a sensor positioner, at least one variable position and/or orientation parameter for the sensor at capture time. In a possible embodiment, a mechanical setup with an automation control may be used, such as a robot arm. In another possible embodiment, a set of several sensors may be placed at different fixed positions and orientations around the training item, and each sensor may be sequentially controlled to take a different capture of the training item, each capture corresponding to a different position and orientation of the training item relative to the fixed training item.

Depending on the actual applications, at least one physical environment parameter may be automatically setup by a physical environment parameter controller. For instance, when using a smartphone for the sensor capture, a dedicated smartphone app may be developed which controls the smartphone lighting towards the object, for instance using the smartphone flashlight in torch mode. More generally, the physical environment around the items to be captured for training may be adapted with at least one physical environment control device such as a lamp, a speaker, and/or a mechanical actuator.

Examples of a physical environment lamp variable characteristics include, but are not limited to: colour temperature, polarization, emission spectrum, intensity, beam shape, impulsion shape, lamp orientation, lamp distance towards the object, etc. Examples of an actuator variable characteristics include, but are not limited to: the volume of water or air projected towards the object; the force applied to brushing it, knocking on it, shearing it, bending it; the temperature of heating or cooling it; the distance of approaching a magnet towards it; the variable placement of movable light reflectors, blockers, diffusers or filters, such as for example Wratten color filters, or interference filters; etc.

In a possible embodiment, a series of digital representations of a training item may be captured with an imaging device as a series of image acquisitions over time under an orientable neon lamp with variable intensity, then under an orientable LED lamp with variable intensity, then under direct sunlight at different times of the day. With this scheme, the set of digital representations will inherently represent several light sources with different spectra and variable intensities and variable positions as input to the machine learning classifier production engine.

In another possible embodiment, a series of digital representations of a training item may be captured with the Apple iPhone with a version equal to the iPhone 7 or more recent, by independently controlling the two torch LEDs, each of which has a different, adjustable, variable colour temperature. As will be apparent to those skilled in the art of imaging, the resulting set of digital representations will inherently represent variable spectral reflectance, transmittance and radiance environments as input to the machine learning classifier production engine.

The above described embodiments may also be combined to provide as broad an input digital representation space of the training items as possible. In the most general case, each of the three different variables in the physical environment which may impact the digital representation signal of a physical item as captured with at least one sensor may be varied step-by-step in different possible ranges to produce a diversity of digital representations of each input item, so that the machine learning can better anticipate the diversity of end user physical environments that its produced classifier solution will encounter at the time of detection:

- The position and orientation of the object in the 3-dimensional space can be varied step by step along any of the position or orientation axes, for instance by increments of 1 mm in translation and 1° in Euler angles;
- The position and orientation of the sensor in the 3-dimensional space can be varied step by step along any of the position or orientation axes, for instance by increments of 1 mm in translation and 1° in Euler angles;
- Various physical environment parameters may be simply varied as on/off, or as step by step increments in any variable associated with the underlying physical component, for instance by increments of 10 lux in light intensity or 1 dB in sound intensity or 1 Hz in frequency intensity, etc.

Core Learning System

Each item been captured with at least one sensor into a diversity of digital representations may be used for training a machine learning system comprising a classifier production engine to produce an automated classifier 130 as a combination of unitary algorithms parametrized with configuration parameters. The produced classifier 130 may then be executed by a detection device at detection time to classify objects to be authenticated as accurately as it was possible to train the system.

In a possible embodiment, at learning time, at least a first set of genuine object items is used for training a classifier 130 to further identify, at detection time, similar object items while discriminating the objects that significantly differ from the first set of object items. Such a classifier 130 can then be used for authentication purposes, to identify genuine objects as the similar ones and the fake objects as the differing ones.

Depending on the actual applications, simple classifiers as disclosed in the prior art may be used with a limited set of digital representations of each training item, for instance convolutional neural networks operating on a set of 128*128 pixel digital images, each image being possibly captured by the sensor under different lighting or position and orientation conditions.

However, in the most general case the diversity of digital representations captured for each training item result in too broad a search space for a simple classifier algorithm to directly process the input digital representation data. There is a need for a combination of multiple algorithms, each possibly with different parametrizations. Manually selecting and testing all possible combinations requires significant time by highly skilled staff such as computer scientists, and is still prone to human processing errors. There is therefore a need for automatically selecting, parametrizing and testing the optimal combination to produce the classifier 130, for instance with a machine learning technology.

In a possible embodiment, as represented on FIG. 1, the produced classifier 130 may comprise a combination of different signal processing algorithms selected from a set of predetermined unitary algorithms {Algo A, Algo B, Algo C, . . . ) 121 and each unitary algorithm may be parametrized with specific values from a set of configuration parameters 122 for each algorithm, e.g. in the exemplary illustration of FIG. 1 the set of two possible variable parameters {i,j} within predetermined ranges for Algo A, a static configuration with no variable parameter for Algo B, and a set of three possible variable parameters {x1;y1;x2;y2} within predetermined ranges for Algo C. The unitary algorithms are not necessarily arranged in series, i.e. the result of the upstream one is passed to the downstream one, but they may also be combined according to any logical operation such as Addition, Subtraction, Multiplier, Divider, Convolution, And, Or, Xor, Not, Comparison above, Comparison below, Comparison equal, Comparison differs. The machine learning system may comprise a classifier production engine 120 which takes as input at least one first set of digital representations 111 resulting from the sensor capture 110 of a set of genuine input object items 101. The classifier production engine 120 may then automatically select a combination of at least two unitary algorithms Algo C 131, Algo B 133 and their associate configuration parameters, for example respectively for Algo C {x1;y1;x2;y2} 132 and for Algo B a static configuration {-} 134 in the set 122 of configuration parameters associated with the unitary algorithms to produce an optimal automated classifier 130 which can later be used by a detection device.

Examples of unitary digital signal processing algorithms 121, 122 for processing digital images representations include, but are not limited to:
Spatial transforms: cropping, scaling, rotating, translating . . . .
Signal space transforms: colour space change, colour decimation, subsampling, oversampling . . . .
Filtering transforms: blurring, deblurring, morphological filtering, image segmentation, contour extraction . . . .
Feature detectors and their associated features vector extraction algorithms: SIFT (Scale-Invariant Feature Transforms), SURF, BRIEF, FAST, STAR, MSER, GFFT, Dense Feature Extractors, ORB, bags-of-word models, Fisher vectors . . . .
Domain transforms: Fourier transform, Discrete Cosine Transform, Wavelet transforms, Cross-correlation of two images, Auto-correlation of one image, . . . .

Examples of unitary digital signal processing algorithms 121, 122 for processing digital audio representations include, but are not limited to:
Time and space domain filters: linear, causal, time-invariant, FIR, IIR filters . . . .
Frequency domain transforms: Fourier, wavelets, cepstrum . . . .

Examples of unitary digital signal processing algorithms 121, 122 for computing metrics on digital signals include, but are not limited to:

| | | |
|---|---|---|
| Euclidean distance | Minkowski distance | L1 or L2 norms |
| Hamming distance | Cosine similarity | Signal-to-noise ratio |
| Manhattan distance | Jaccard similarity | |

Examples of unitary digital signal processing algorithms 121, 122 for classifying digital signals include, but are not limited to:
Linear classifiers, such as for instance Naïve Bayes classifiers
Principal Component Analysis
K-means clustering
Quadratic classifiers
Support Vector Machines, possibly with data fusion for multisensory input data
Neural Networks
Decision trees In a possible embodiment, the unitary digital signal processing algorithms may be represented in a binary machine language suitable for the detection apparatus to execute the selected classifier algorithms 131, 133. In another possible embodiment, the unitary digital signal processing algorithms may be represented in a meta-language readable to both human and machine logic, for instance in a conventional programming language as used human computer scientists, and a further classifier compilation engine (not represented) may be used to translate the resulting produced classifier algorithms into the machine language suitable to the detection device. As will be apparent, the latter embodiment may facilitate the verification by human programmers of the output of the classifier production engine as well as the interoperability of the produced classifier with different detection devices.

In general, each unitary digital signal processing algorithm 121 may also be configured with a set of configuration parameters 122. For instance on a 2D digital object representation the crop algorithm may be configured with four parameters {CROP:startX,CROP:startY,CROP:endX,CROP:endY}, the translation algorithm may be configured with two parameters {TRANSLATE:deltaX,TRANSLATE:deltaY}, a local equalizer filter algorithm may be configured with one parameter {EQUALIZER:r}, etc.

In a possible embodiment, the classifier production engine 120 may employ a decision tree to determine the optimal combination of unitary algorithms 121 and their configuration parameters 122 to classify as similar the digital representations 111 of the input items 101. For example, the classifier may propose to apply the following decision tree: if Algo B returns value ($B_0$ OR B1) AND Algo C returns value C1 in the range [Ci,Cj], then the object may be classified as genuine.

In another possible embodiment, the classifier production engine 120 may employ a genetic programming method such as a tree-based genetic programming method (TGP), a linear genetic programming method (LGP), a Cartesian genetic programming method, a push genetic programming method, automatically defined functions, or metagenetic programming to more efficiently produce the set 131, 133 and/or their configuration parameters 132, 134 out of the search space of all possible combinations of unitary algorithms 121 and their configuration parameters 122.

In a possible embodiment, the classifier production engine 120, the classifier production engine 120 may employ a convolutional or a deep neural network method to more efficiently produce the set of algorithms 131, 133 and/or their configuration parameters 132, 134 out of the search space of all possible combinations of unitary algorithms 121 and/or possible values of each unitary algorithm configuration parameters 122.

Evolutionary Learning System

In a possible embodiment, the classifier production engine may also dynamically adapt the classifier algorithms 121 and their configuration parameters 122 to changes over time in the training set and/or the physical environment. For instance, when the production characteristics change, such as the manufacturing mould or printing characteristics, different sub-classes of genuine objects may be identified and labelled in the training set and the classifier production engine 120 may then identify the automated classifier algorithms 131, 133 and/or their configuration parameters 132, 134 such that the classifier which can also label as genuine and sub-label as a predetermined sub-class of genuine items the object items similar to the items in the training set according to their closest sub-category match. Preferably, the classifier production engine 120 may identify the combination of algorithms 131, 133 and their configuration parameters 132, 134 to produce a classifier 130 such that an object item cannot be classified as similar to both a primary sub-class and a secondary sub-class of the genuine objects.

Furthermore, as fake objects are seized in the black market, they may be assembled into a second set 102 of input training items which can also be converted into digital representations 112 by at least one sensor capture 110. The classifier production engine 120 may then identify the combination of algorithms 131, 133 and their configuration parameters 132, 134 to produce a classifier which can also label as fake the object items similar to the items in the second set. In a further possible embodiment, different sub-classes of fake objects may be identified and labelled in the second training set and the classifier production engine 120 may then identify the combination of algorithms 131, 133 and their configuration parameters 132, 134 to produce a classifier which can also label as fake and sub-label as a predetermined sub-class of fake items the object items similar to the items in the second set according to their closest sub-category match.

In a possible embodiment (not represented) the classifier production engine 120 may further create and configure variants of the unitary algorithms 121 and/or their configuration parameters 122. As an example, a cross-correlation unitary algorithm may be adapted to cross-correlate an input signal with a self-generated reference template signal which can be recorded as a synthetically generated configuration parameter in the set 132 of configuration parameters associated with the cross-correlation unitary algorithm 131. The self-generated reference template configuration parameter signal may be automatically produced by the classifier production engine 120 by synthetizing a set of template digital representation signal candidates and selecting as the self-generated reference template as 1) the template signal candidate which maximises the signal-to-noise ratio (SNR) of its cross-correlation with each signal issued from each digital representation 111 of the genuine items 101, and/or 2) as the template signal candidate which minimises the signal-to-noise ratio (SNR) of its cross-correlation with each signal issued from each digital representation 112 of the fake items 102. In a possible embodiment, different templates may be generated for different sub-classes of genuine objects in the training set and the classifier production engine 120 may then identify the combination of algorithms 131, 133 and their configuration parameters 132, 134 to produce a classifier which can also label as genuine and sub-label as a predetermined sub-class of genuine items the object items similar to the items in the training set such that a template that results in the classification of the digital representations of the object items as a first sub-label (e.g. mold A) shall not result in the classification of the digital representations of the object items as a second sub-label (e.g. mold B).

In a possible further embodiment the classifier production engine 120 may select a genuine self-generated reference template as the template signal candidate which maximises the signal-to-noise ratio (SNR) of its cross-correlation with each signal issued from each digital representation 111 of the genuine items 101 and a fake self-generated reference template as the template signal candidate which minimises the signal-to-noise ratio (SNR) of its cross-correlation with each signal issued from each digital representation 112 of the fake items 102, so that both the genuine and the fake reference template may be used as configuration parameters 122 for cross-correlation algorithms 121 selected into the produced classifier.

Depending on the actual applications, the proposed machine learning system may also use a third set of genuine items of a fourth test of fake items for test purposes. These sets may be used by the proposed machine learning system as test inputs to validate the capacity of generalization of the classifier produced by the classifier production engine. For instance, when using a neural network classifier, in the case of failure of generalization, state of the art techniques include for instance pruning (for instance removing neuron or layers) of the neural network in order to minimize overfitting.

Authentication Detection

As will be apparent to those skilled in the art of anticounterfeiting authentication, the produced classifier 130 comprising a combination of classifier algorithms 131, 133 with the selection of associated optimal configuration parameters 132, 134 may then be directly used by a detection device 220 to classify as genuine or fake any object item 201 to authenticate. Similar to the process applied at the time of machine learning, the object item 201 is first converted by means of a sensor capture 210 into a digital representation 211.

In a possible embodiment, the sensor capture 210 and the detection device 220 may be integrated into the same device, for instance in a smartphone with a dedicated app to download the produced classifier 130 comprising the algorithms 131, 133 with the selection of associated optimal configuration parameters 132, 134 as executable and data in the proper machine language and format for the specific smartphone, for instance an Apple smartphone of a specific hardware generation under a specific iOS software version or a Samsung smartphone of a specific hardware generation under a specific Android software version. As will be apparent to those skilled in the art of embedded systems design, this embodiment has the advantage that the detection device may operate in a standalone mode without relying upon remote server connections at the time of the detection operations. The availability of remote server connections may then be required only at the time of configuring or upgrading the detection device software with the produced classifier 130 algorithms 131, 133 and the selection of associated optimal configuration parameters data 132, 134. This embodiment is therefore particularly suitable to ambulatory custom controls, as well as automated fake item detection in automated internet merchandising distribution lines.

In another possible embodiment, the sensor capture 210 on the one hand and the detection device 220 on the other hand may be integrated into different devices, for instance a smartphone with a dedicated app may be used to locally capture one or more digital representations 211 of the item 201 and the digital representations may be uploaded onto a server (not represented) remotely operating as the detection device 220. As will be apparent to those skilled in the art of machine learning, this embodiment facilitates the evolution of the machine learning itself, for instance by feeding back the detection representation images as additional sets into the machine learning itself.

Automated Capture of Multiple Digital Representations

Figure 3:
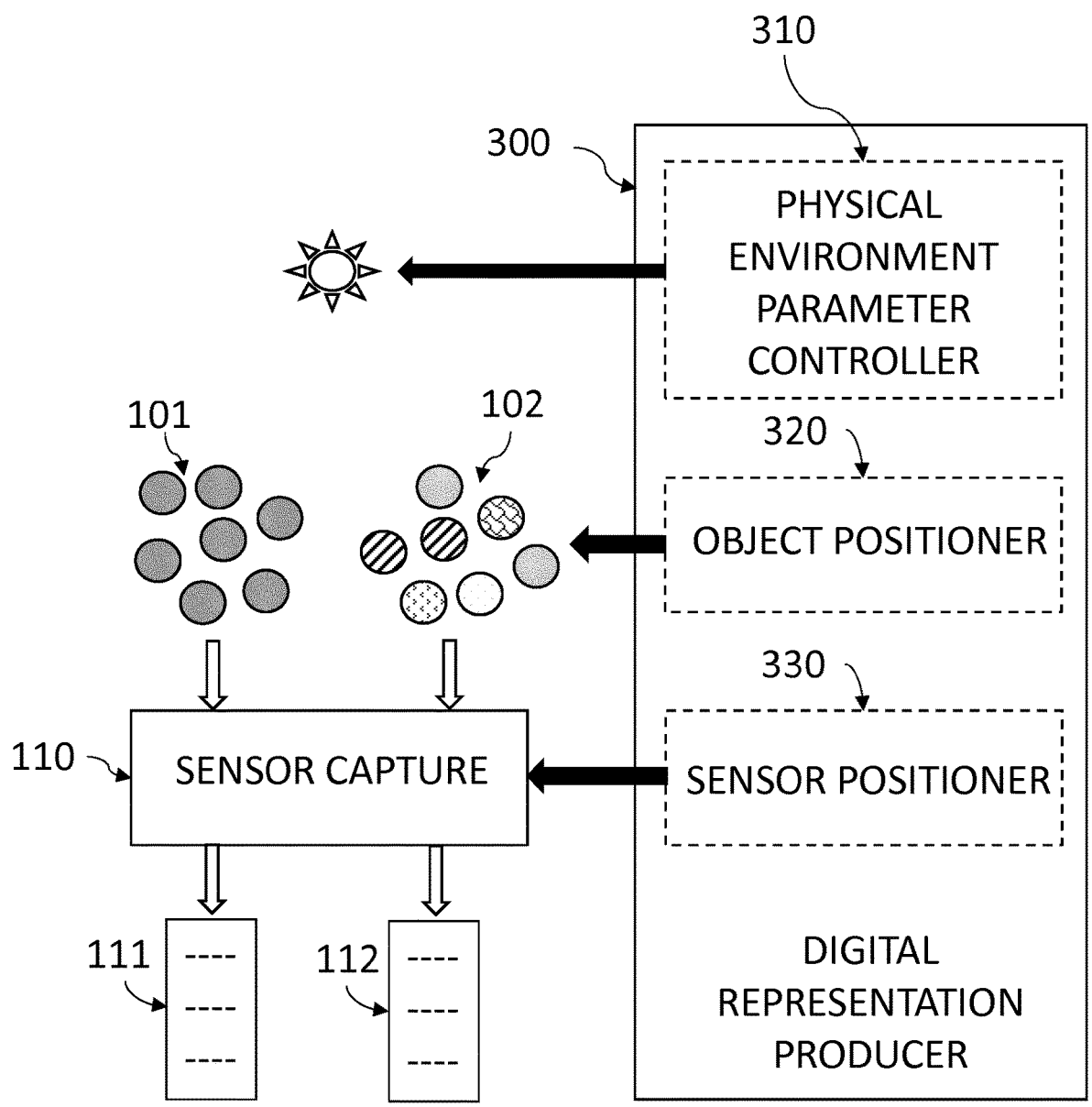
FIG. 3 depicts a machine learning system with a digital representation producer component according to a possible embodiment of the present disclosure, comprising a physical environment parameter controller, an object positioner and a sensor positioner.

As illustrated by FIG. 3, the proposed machine learning system may employ a diversity of digital representations of input items 101 or 102. In a preferred embodiment, the system may comprise a digital representation producer 300 to control different physical environment configurations by means by at least of one of:
- A physical environment parameter controller 110, to setup and vary at least one physical parameter of the environment to which the sensor capture 110 is sensitive, so that the digital representation 111 of the object item 101 changes when the at least one physical parameter changes;
- An object positioner 320, to setup and manipulate the object in a diversity of positions and/or orientations along one or more degrees of freedom in the 3D physical environment space;
- A sensor positioner 330, to setup and manipulate at least one sensor in a diversity of positions and/or orientations along one or more degrees of freedom in the 3D physical environment space.

In a possible embodiment, multiple physical parameters may be controlled by the physical environment parameter controller 310. The physical environment parameter controller 310 may be a centralized controller as part of the end-to-end machine learning computing system or it may be distributed as a set of physical environment parameter controllers associated with the physical apparatus modifying the physical environment, such as a local lamp controller (for instance, varying the position and/or intensity of the light), a local speaker controller (for instance, varying the position and/or the volume of the sound), and/or an actuator (for instance, varying the force of the action applied to the object).

In a possible embodiment, multiple sensors may be controlled by the sensor positioner 330. The sensor positioner 330 may be a centralized controller as part of the end-to-end machine learning computing system or it may be distributed as a set of dedicated local sensor positioner components specific to each sensor configuration.

In a further possible embodiment (not represented), the digital representation producer 330 may also control additional parameters related to the sensor configuration which may also impact the sensor capture 110 of a digital representation 111 (resp. 112) of an input item 101 (resp. 112).

Examples of such parameters for a camera sensor may be the camera aperture, the camera mode (standard picture, square picture, 16:9 picture, panoramic picture, standard video, slow motion video . . . ), but other parameters are also possible. Examples of such parameters for a microphone sensor may be the sensitivity level and/or the application of ambient noise filtering, but other parameters are also possible.

Exemplary Embodiments

Figure 4:
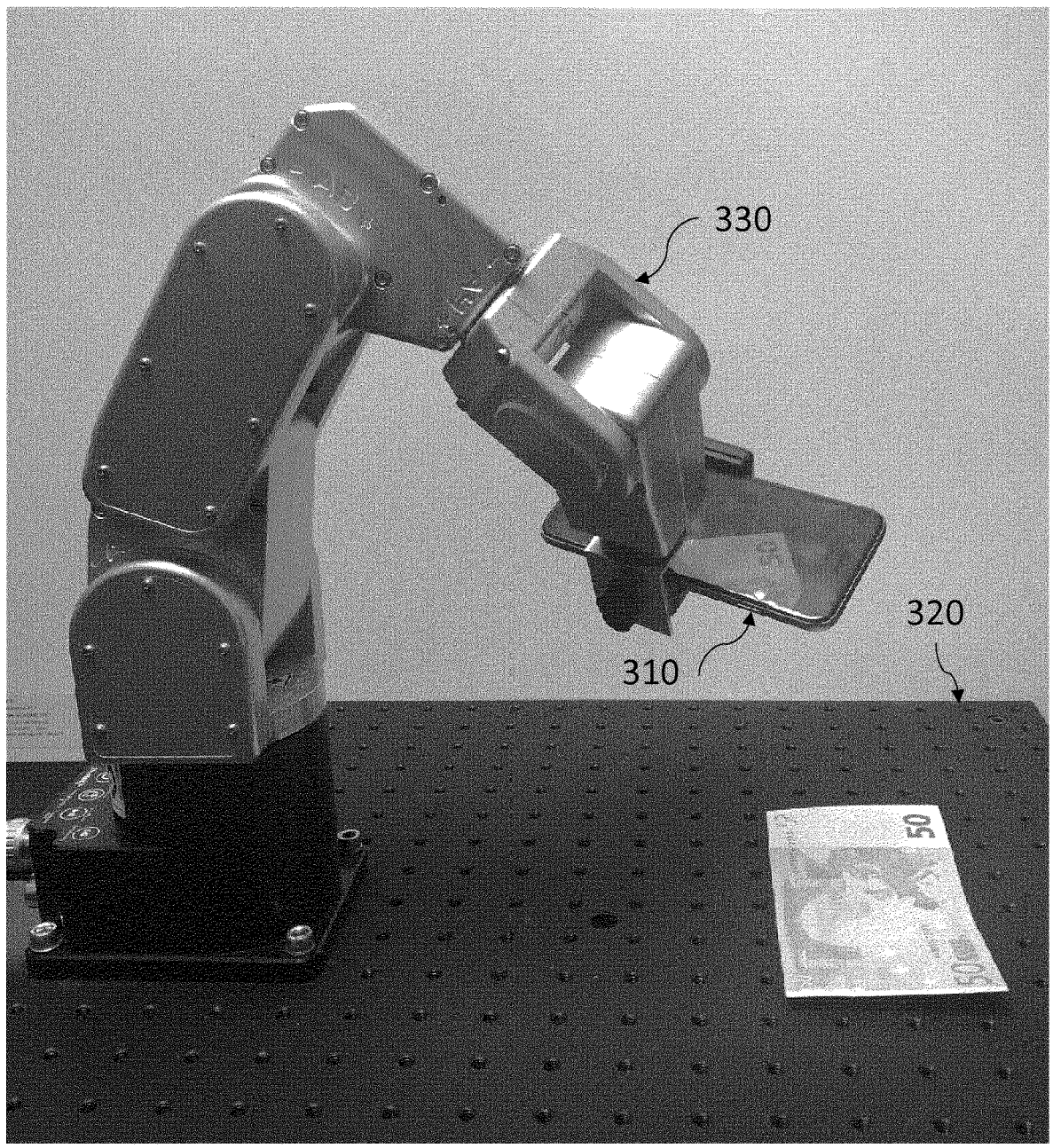
FIG. 4 shows a robot arm manipulating an imaging device to capture multiple pictures as digital representations of a predetermined fake or genuine banknote physical object so that the machine learning system can explore and determine which features discriminate the fake from the genuine object in as large a digital representation space as possible.
Figure 5:
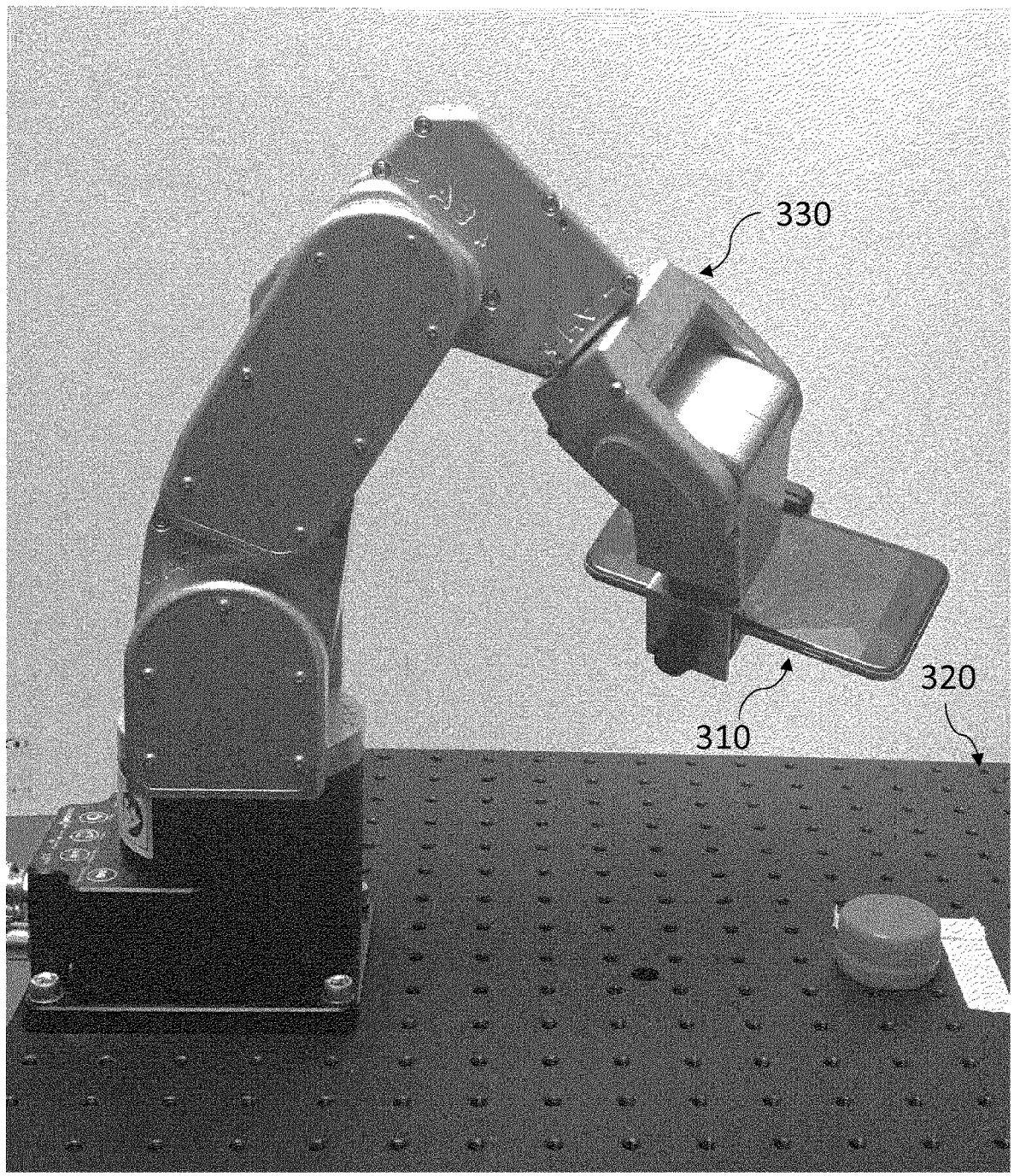
FIG. 5 shows a robot arm manipulating an imaging device to capture multiple pictures of a predetermined fake or genuine product element so that the machine learning system can explore and determine which features discriminate the fake from the genuine object in as large a digital representation space as possible.

FIG. 4 shows an exemplary embodiment of a banknote authentication machine learning system and FIG. 5 shows an exemplary embodiment of a product item (bottle cap) authentication machine learning system, using an Apple iphone 7 both as a camera sensor and as the physical environment parameter controller 310 controlling of the lighting produced the smartphone, and a compact Mecademic Meca500 robot arm with 6 degrees of freedom as the sensor positioner 330. In this configuration, the input item simply lies on the robot platform at a position which is manually selected on the platform grid, but it will be apparent to those skilled in the art of automation system that various object positioner 320 can be easily adapted to such a platform to further automatize the object positioning. As the physical environment parameter controller 310, a dedicated smartphone app controls both the camera sensor capture and the smartphone lighting in torch mode towards the banknote. The robot arm may be simply programmed as the sensor positioner 330 to move the smartphone step-by-step into a diversity of positions and orientations, which inherently defines the sensor position and orientation as well the light position and orientation, as both the camera and the LED lamps are part of the iphone rigid object body. Examples of simple programs to position the robot arm using the pose Cartesian position parameters {x,y,z} and the Euler angles orientation parameters {alpha, beta and gamma} can be found in the Meca500 Programming Manual, available online at https://www.mecademic.com/Documentation/Meca500-Programming-Manual.pdf.

Figure 6:
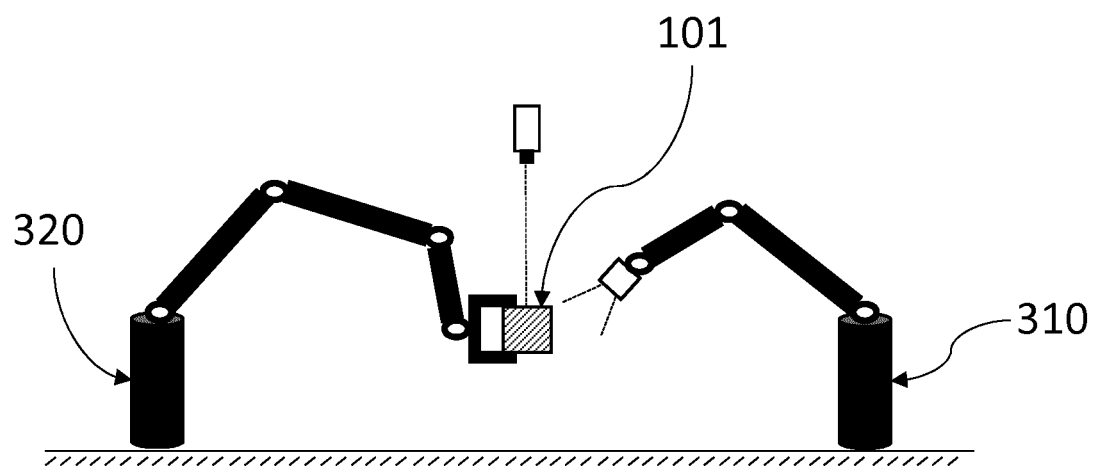
FIG. 6 illustrates the side view of a machine learning input system comprising a fixed imaging device and two robot arms, one manipulating the fake or genuine input physical object or banknote and one manipulating a lighting device.

FIG. 6 illustrates another embodiment wherein two robot arms are used, the first one as the object 101 positioner 320 and the second one as the physical environment parameter controller 310. The second robot arm manipulates a lamp which illuminates the object 101 from a diversity of positions and orientations as may be controlled by the robot arm. In this setup, the sensor camera is represented at a fixed position above the pair of robot arms, but it may also be manually or automatically placed in different positions or a set of fixed cameras may be employed to capture different views of the same scene (illuminated object).

Figure 7:
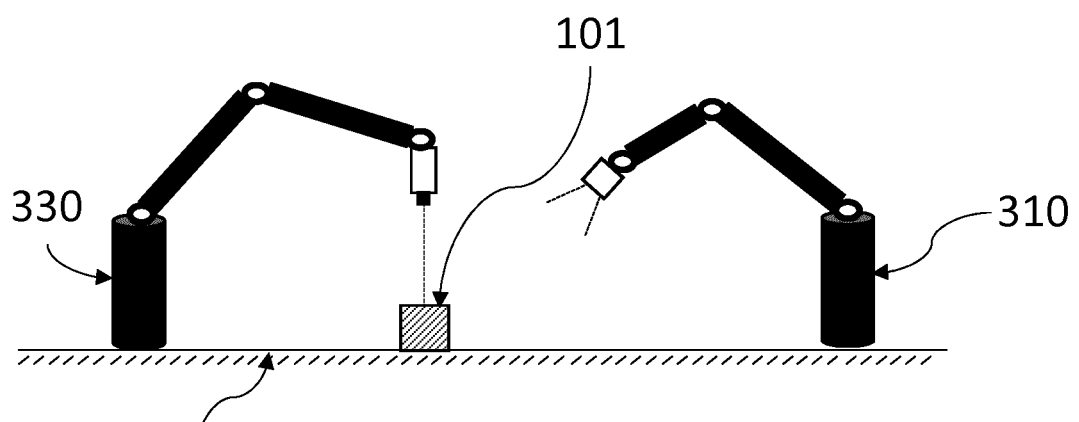
FIG. 7 illustrates the side view of a machine learning input system comprising a conveyor for carrying the the fake or genuine input physical object and two robot arms, one manipulating an imaging device and one manipulating a lighting device.

FIG. 7 illustrates another embodiment wherein the object 101 lies on a fixed platform and two robot arms are used to capture a diversity of digital representations of it, the first one as the sensor positioner 330 holding a camera sensor, and the second one as the physical environment parameter controller 310 holding a lamp. The second robot arm manipulates the lamp which illuminates the object 101 from a diversity of positions and orientations, as may be controlled by robot arm. In this setup, the sensor camera is represented at a fixed position above the object, but it may also be automatically placed in different positions and orientations by the first robot arm programmed as the sensor positioner 330.

Figure 8A:
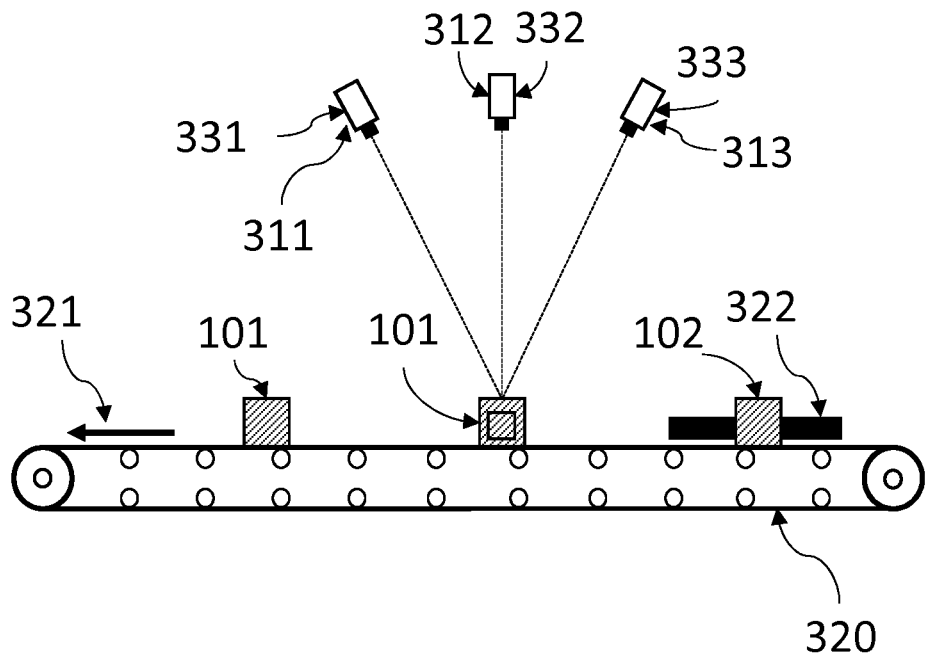
FIG. 8 illustrates the schematic a) front, b) side and c) top views of a conveyor system adapted to capture multiple pictures of a predetermined fake or genuine product element so that the machine learning system can explore and determine which features discriminate the fake from the genuine object in as large a digital representation space as possible.
Figure 8B:
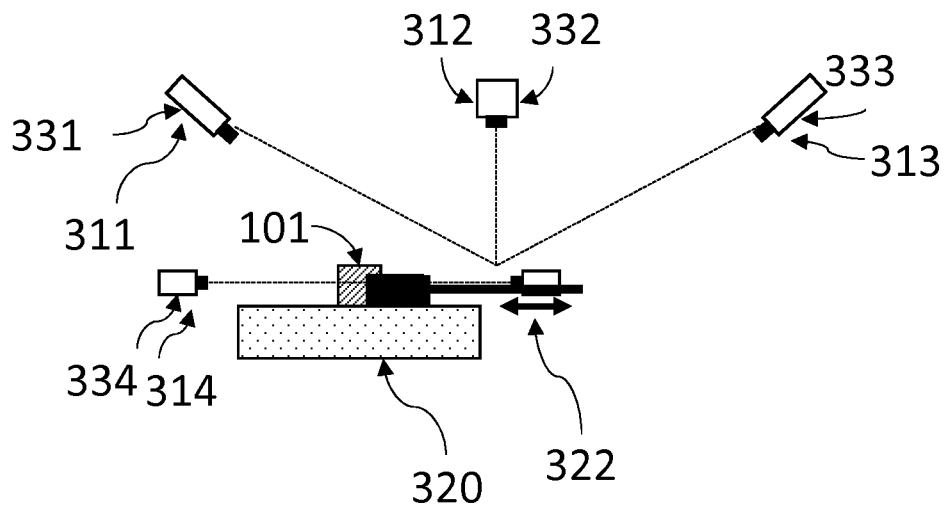
Figure 8C:
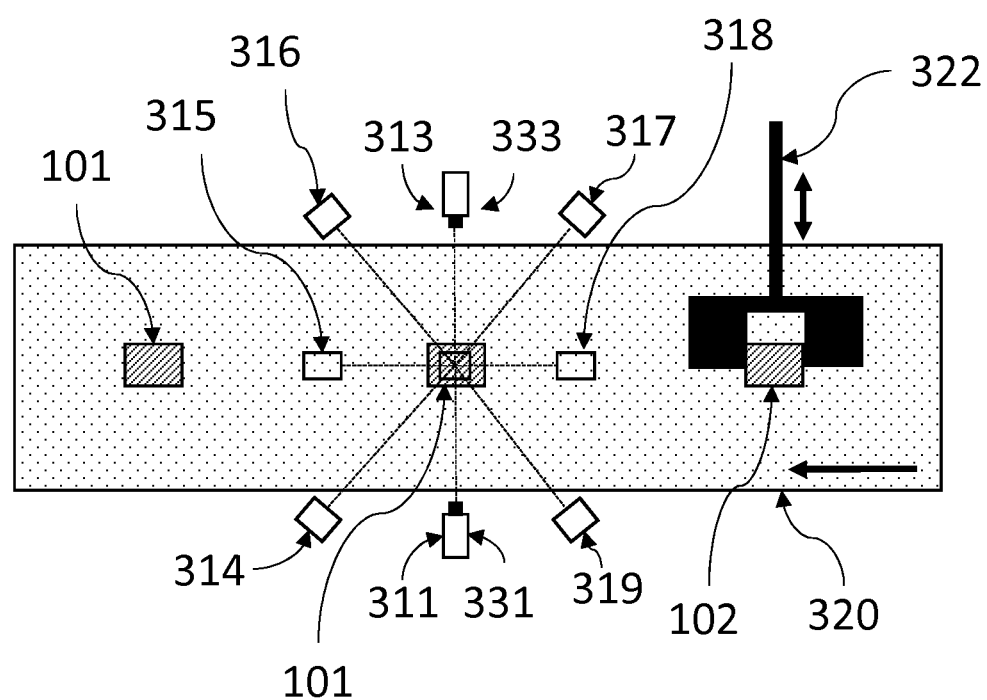

FIGS. 8*a*), 8*b*) and 8*c*) show respectively the front, side and top views of another embodiment wherein the set 101 of objects are conveyed one by one on a moving conveyor 321 under a set of digital cameras at different fixed positions and orientations (the capture sensors) in combination with a set of lamps (the physical environment parameters). An automated arm 322 may further control the position of the object and possibly adjust its position and/or orientation on the conveyor if so desired. A physical environment parameter controller 311, 312, 313, 314, 315, 316, 317, 318, 319 may be associated with each lamp. Note that in the illustrated example, some lamps 311, 312, 313 may be directly embedded with the cameras while others 314, 315, 316, 317, 318 may have been mounted separately from the cameras in distributed standalone positions all around the object vertical axis, but other embodiments are also possible. The lamps may be sequentially setup on and off to illuminate the object from different angles so that a digital representation of the visible object surfaces may be captured by the camera sensors 331, 332, 333 under different illumination conditions as each object passes below the camera sensors.

As will be apparent to those skilled in the art of automation, the above described embodiments are only exemplary setups of the proposed digital representation capture system. The actual setups of the object positioner 320, the sensor positioner 330 (possibly for multiple sensors) and the physical environment parameter controller 310 (possibly for multiple physical environment parameters) may be further combined or adapted to address the specific needs of each authentication application. For instance, in a banknote authentication training system, a more sophisticated robot arm may be adapted to bend and wrinkle the banknote item while a second robot arm captures the sound of the wrinkled banknote with a microphone sensor. Other embodiments are also possible.

Figure 9:
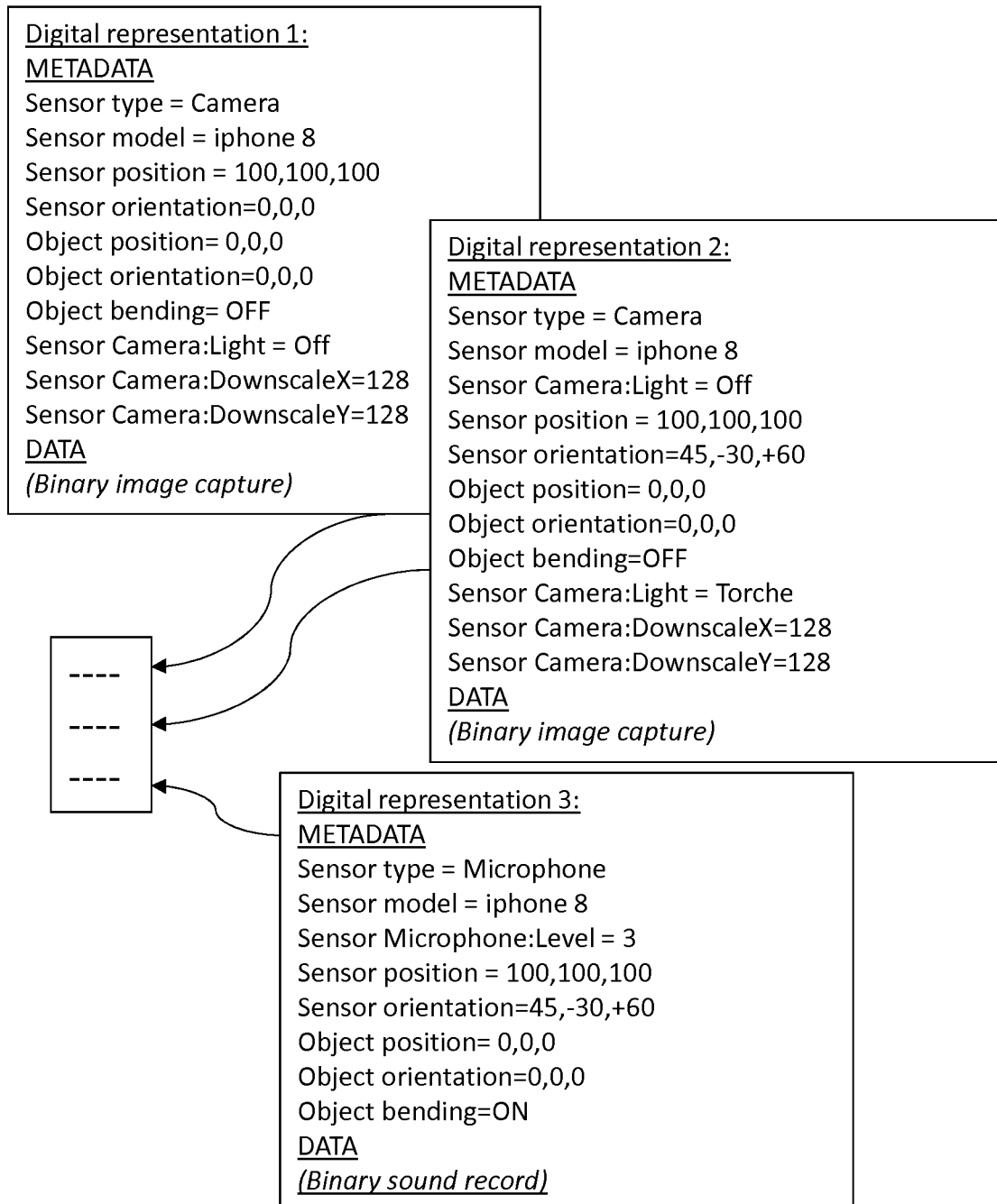
FIG. 9 shows possible content of a digital representation as may be transmitted by the digital representation producer to the classifier production engine.

FIG. 9 illustrates possible digital representations as may be generated by the proposed digital representation producer 300 for different sensor capture processes 110 in accordance with different physical environment parameters, object positions and/or orientations, and sensor position and/or orientations.

In the case of a sensor camera, the digital representation 111 comprises at least the raw data representing the item 101 as a binary image. Additional metadata may be associated with the raw data such as information about the capture conditions smartphone captured image resolution downscaled to 128*128 pixels, smartphone torch on or off, etc as well as information on the sensor and object respective positions and/or orientations. As will be apparent to those skilled in machine learning programming, this information may not be necessary as input to a classifier production engine 120 in unsupervised training mode, but it may be useful to further guide the training in some supervised training modes.

In the case of a sensor microphone, the digital representation 111 comprises at least the raw data representing the item 101 as a binary image. Additional metadata may be associated with the raw data such as information about the capture conditions smartphone microphone level, etc as well as information on the sensor and object respective positions and/or orientations.

As will be apparent to those skilled in the digital data processing, the above described embodiments are only exemplary parametrization of the proposed digital representation formats. A diversity of raw data formats (for instance, compressed formats, different colour spaces, etc) as well as a diversity of metadata parameters may be employed in the end-to-end training system, which may also comprise digital representation format converters and data processing algorithms as well as dedicated configuration parameters in the set 121 of unitary algorithms and/or the set 122 of associated configuration parameters.

Figure 10:
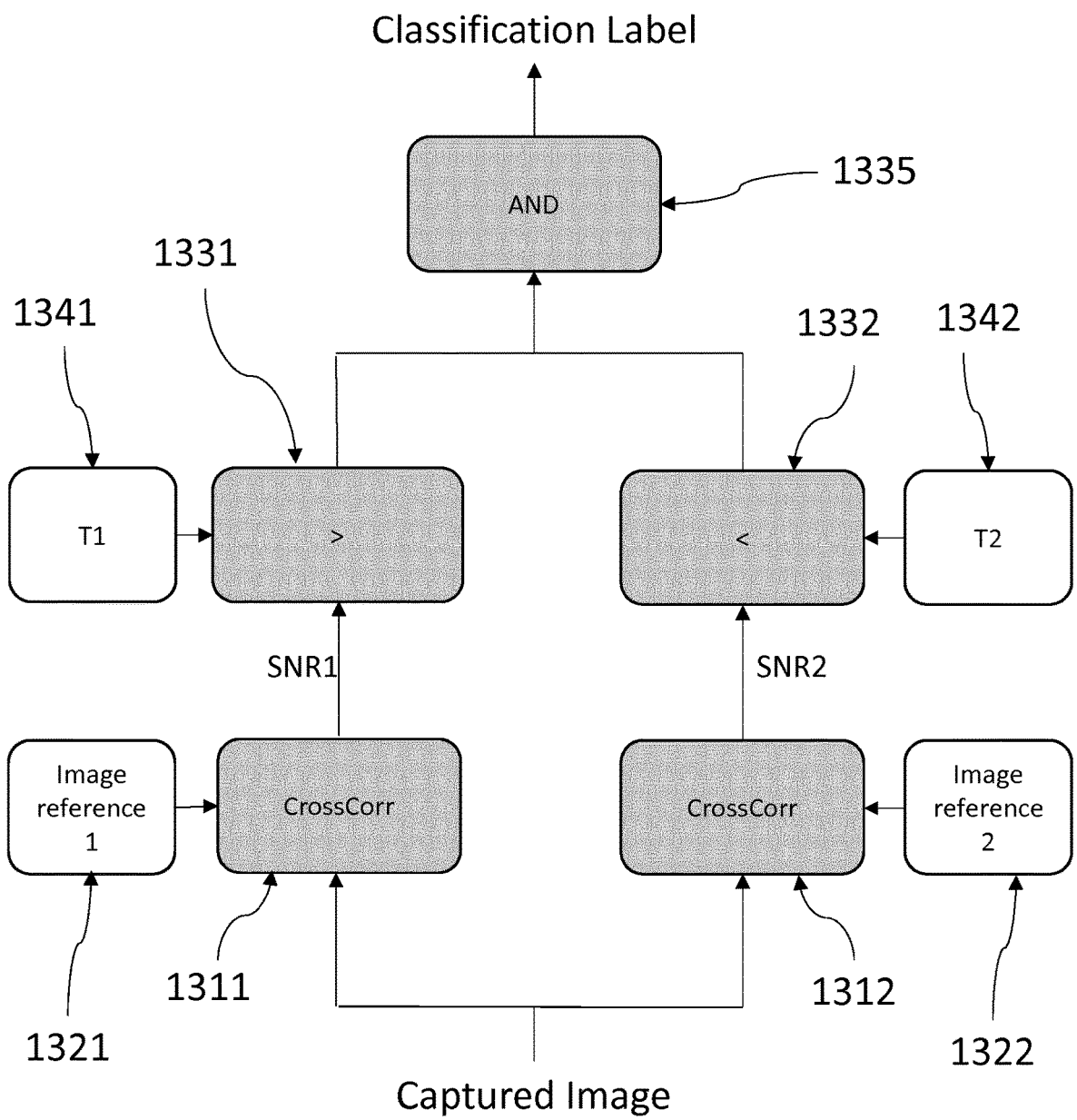
FIG. 10 shows an exemplary decision tree classifier as may be the produced by the proposed classifier production engine.

FIG. 10 shows an exemplary decision tree classifier 130 as may be produced by the proposed machine learning system. The produced classifier 130 uses both a synthetically generated reference template pattern for genuine items and a synthetically generated reference template pattern for fake items as the respective configuration parameters 1321, 1322 for two instances of a cross-correlation unitary algorithm 1311, 1312. The produced classifier 130 may thus uses the mathematical cross-correlation algorithms in combination with simple logical unitary algorithms:

one unitary algorithm CrossCorr 1311 returning the SNR (signal-to-noise ratio) of the cross-correlation between the input captured image and the synthetic image reference template 1 (genuine template) as the configuration parameter 1321 for this unitary algorithm;

one unitary algorithm CrossCorr 1312 returning the SNR (signal-to-noise ratio) of the cross-correlation between the input captured image and the synthetic image reference template 2 (fake template) as the configuration parameter 1322 for this unitary algorithm;

one unitary algorithm Above 1313 returning true if the SNR (signal-to-noise ratio) of the cross-correlation is above a threshold value T1 as the configuration parameter 1341 for this unitary algorithm, and returning false otherwise;

one unitary algorithm Below 1314 returning true if the SNR (signal-to-noise ratio) of the cross-correlation is below a threshold value T2 as the configuration parameter 1342 for this unitary algorithm, and returning false otherwise;

one unitary algorithm And 1315 returning the value 1 corresponding to the Genuine classification label or 0 corresponding to the Fake classification label.

At detection time, the produced classifier of FIG. 10:

cross-correlates the captured digital representation image 211 of the item to be authenticated 201 with the generated pattern 1321 for genuine objects and checks if the SNR is above the T1 threshold value (for instance, 12 dB) on the resulting cross-correlation signal to determine that the object item 201 is similar to the set of genuine objects;

cross-correlates the captured digital representation image 211 of the item to be authenticated 201 with the generated pattern 1322 for at least one set of fake objects and checks if the SNR is below the T2 threshold value (for instance, 10 dB) on the resulting cross-correlation signal to determine that the object item 201 is similar to the set of fake objects;

compares the results of the genuine classification and the fake classification and solely classifies as genuine the object item 201 which is both a good match to the genuine classification and a non-match to the fake classification.

Figure 11:
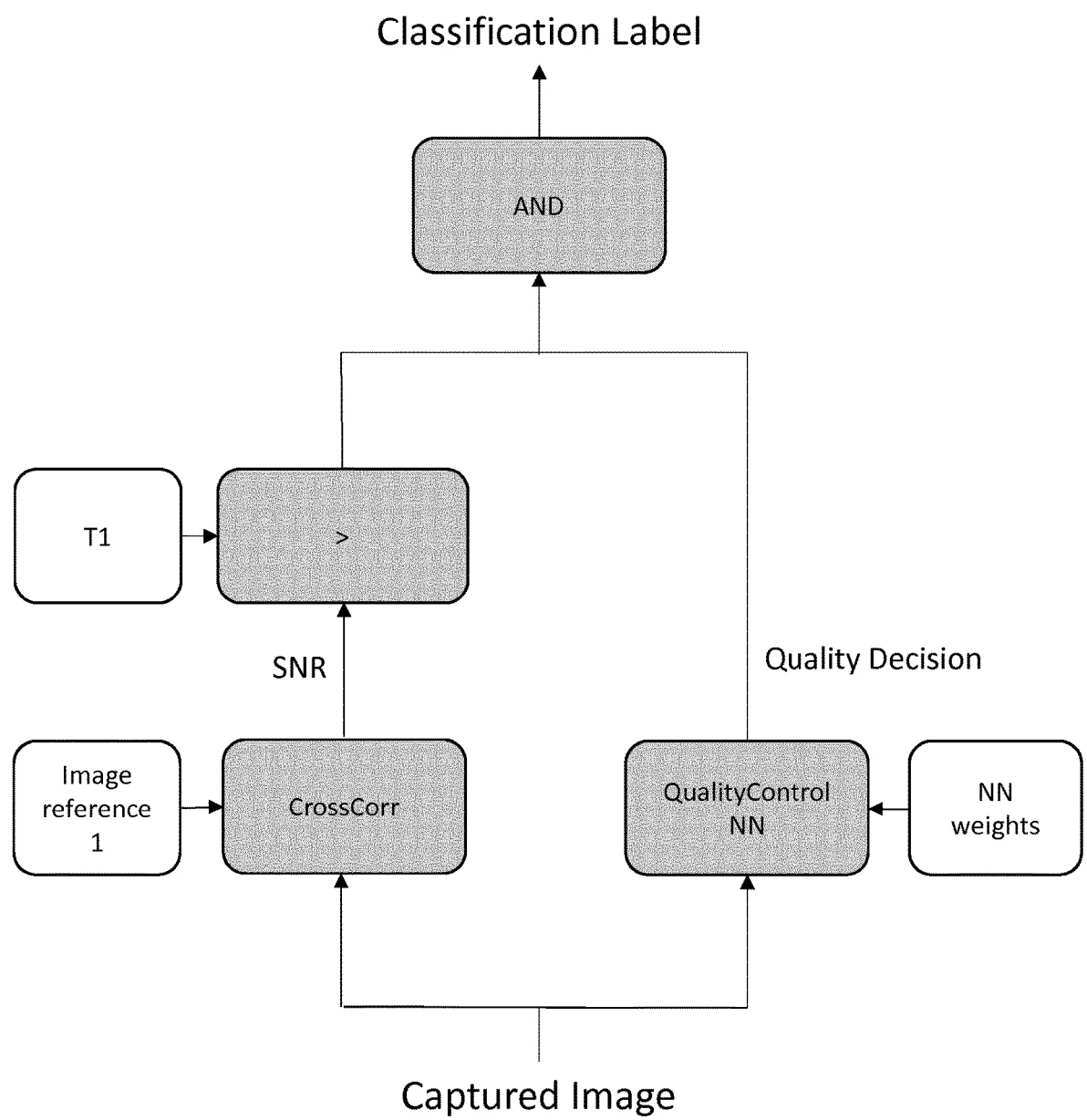
FIG. 11 shows an exemplary decision tree classifier as may be the produced by the proposed classifier production engine.

FIG. 11 another exemplary decision tree classifier with an inherent pre-processing control as may be produced by the proposed machine learning system. In this exemplary embodiment, the produced classifier uses a genuine cross-correlation unitary algorithm in combination with a pre-processor dedicated classifier algorithm to evaluate if the captured digital representation image 211 of the item to be authenticated 201 is of a good enough quality to enable its classification by the proposed machine learning system.

In a possible embodiment, a quality control unitary algorithm QualityControlNN, for instance a deep convolution neural network taking as input the image 211 and returning a decision value 1 Good enough or 0 Not good enough, is selected as the pre-processor dedicated classifier algorithm 121, and its set of configuration parameters 122, for instance the neural network connection weights, are selected by classifier production engine.

At detection time, the produced classifier of FIG. 11 then:
applies the quality control unitary algorithm QualityControlNN to the captured digital representation image 211 of the item to be authenticated 201 and returns the decision value 1 Good enough or 0 Not good enough for this capture;
if the decision value is Good enough, cross-correlates the captured digital representation image 211 of the item to be authenticated 201 with the image reference pattern 1 representative of the set of genuine objects and checks that the resulting SNR on the resulting cross-correlation signal is above the T1 threshold value (for instance, a SNR of 12 dB) to result in the classification label 1, indicating that the object item 201 is similar to the set of genuine objects;
if the decision is Not good enough, return the classification label 0 indicating that the object item 201 is not similar to the set of genuine objects but also not similar to any possible set of fake objects.

While in the examples of FIG. 10 and FIG. 11, cross-correlation algorithms and SNR threshold metrics for the sake of simple illustration, it will be apparent to those skilled in the art of digital signal processing and authentication that many other mathematical algorithms (for instance, using feature vectors) or metrics (for instance, statistical distances) may be more generally employed, combined and configured by the proposed classifier production engine 120 to produce an automated classifier 130.

Other Embodiments and Applications

In a further possible embodiment, the produced classifier may also comprise further post-processing methods to improve the end user authentication experience. In a possible embodiment, the produced classifier may calculate an estimate value of its authentication performance reliability as a function of the cross-correlation signal strength for one or more assessed templates. In another possible embodiment, if the Not good enough classification happens too frequently with the exemplary classifier of FIG. 11, the produced classifier may trigger further corrective actions by the detection device so that the capture process at learning time and the capture process at detection time are better aligned. As a possible corrective action, the capture process by the detection device may be optimized by configuring different settings for the detection device sensor and/or by varying the physical environment parameters in the detection device environment, the detected object positions and/or orientations, and/or the sensor position and/or orientations. As another possible corrective action, the capture process at learning time may also be optimized, for instance directly in the object production environment such as the conveyor in the production chain, by configuring different settings for the capture device sensor and/or selecting a broader set of different physical environment parameters, a broader set of object positions and/or orientations, and/or a broader set of sensor position and/or orientations to be as representative as possible of the detection capture conditions in a diversity of environments as may be met by authentication control end users.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

As will be apparent to those skilled in the art of digital data communications, the methods described herein may be indifferently applied to various data structures such as data files or data streams. The terms data, data structures, data fields, file, or stream may thus be used indifferently throughout this specification.

Although the detailed description above contains many specific details, these should not be construed as limiting the scope of the embodiments but as merely providing illustrations of some of several embodiments.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methods are sufficiently flexible and configurable such that they may be utilized in ways other than that shown.

Although the term at least one may often be used in the specification, claims and drawings, the terms a, an, the, said, etc. also signify at least one or the at least one in the specification, claims and drawings.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, units, or mechanisms. Modules or units may constitute either software modules (e.g., code embodied on a machine-readable medium or in a transmission signal) or hardware modules. A hardware module is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, biologically or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. As synthetic biology develops, all or part of the hardware module may be made of biological cells, such as neurospheres and/or genetically engineered cells.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, processor-implemented module refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an algorithm is a self-consistent sequence of operations or similar processing leading to a desired result. In this context, algorithms and operations involve physical manipulation of physical quantities.

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term invention merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A computer-implemented method for producing, with at least one processor, the computing language software code and data parameters of an automated classifier of objects for authentication purposes, the method comprising:

obtaining a first set of object items for training the classifier;

obtaining a set of unitary digital representation processing algorithms and for each unitary digital representation processing algorithm, obtaining a set of configuration parameters suitable for parametrizing the execution of the digital representation processing algorithm;

acquiring, with at least one sensor, a plurality of digital signal representations of each object item in the first set, each of the plurality of digital signal representations being acquired for a predetermined object item position and orientation, for at least one predetermined sensor position and orientation, and for at least one predetermined physical environment parameter, such that the value of the physical environment parameter changes the digital signal representation of the object item at the predetermined object position and orientation and at the predetermined sensor position and orientation;

selecting, with the at least one processor, at least one unitary digital signal processing algorithm in the set of unitary digital representation processing algorithms, and configuring at least one parameter in the set of configuration parameters for the algorithm selected from the set of unitary digital representation processing algorithms, to produce an automated classifier to classify the digital representations of further objects as similar or different from the first set of object items;

obtaining a primary subset and a secondary subset in the first set of object items for training the classifier, the object items in the primary subset being labelled as different from the object items in the secondary subset in response to changes in the production characteristics; and configuring at least one parameter in the set of configuration parameters for the algorithm selected from the set of unitary digital representation processing algorithms, to produce an automated classifier to classify the digital representations of further objects as similar or different from the primary subset of object items and as similar or different from the secondary subset of object items, such that an object item cannot be classified as similar to both the primary subset and the secondary subset.

2. The method of claim 1, wherein at least one predetermined physical environment parameter value is selected from a range of possible values.

3. The method of claim 1, wherein at least one predetermined sensor position and/or orientation value is selected from a range of possible values.

4. The method of claim 1, wherein at least one predetermined object position and/or orientation value is selected from a range of possible values.

5. The method of claim 3, wherein a robot arm positions the sensor at the selected position and/or orientation value.

6. The method of claim 4, wherein a robot arm positions the object at the selected position and/or orientation value.

7. The method of claim 4, wherein a conveyor positions the object at the selected position and/or orientation value.

8. The method of claim 1, further comprising:
obtaining a second set of object items for training the classifier, the object items in the second set being labelled as different from the object items in the first set;
acquiring, with the at least one sensor, a plurality of digital signal representations of each object item in the second set, each of the plurality of digital signal representations being acquired for a predetermined object item position and orientation, for at least one predetermined sensor position and orientation, and for at least one predetermined physical environment parameter, such that the value of the physical environment parameter changes the digital signal representation of the object item at the predetermined object position and orientation and at the predetermined sensor position and orientation; and
selecting, with the at least one processor, at least one unitary digital signal processing algorithm in the set of unitary digital representation processing algorithms, and configuring at least one parameter in the set of configuration parameters for this the selected algorithm, to produce an automated classifier to classify the digital representations of further objects as similar or different from the second set of object items.

9. The method of claim 1, further comprising:
producing, with the at least one processor, at least one self-generated reference template signal as a configuration parameter for at least one unitary digital representation processing algorithm.

10. The method of claim 1, further comprising: selecting, with a genetic programming algorithm, at least one unitary digital signal processing algorithm in the set of unitary digital representation processing algorithms and at least one parameter in the set of configuration parameters for parametrizing this algorithm.

11. The method of claim 1, wherein the set of unitary digital representation processing algorithms comprises a deep convolutional neural network to classify images, the method further comprising:
producing, with the at least one processor, at least one set of neural network weights as a configuration parameter for the deep convolutional neural network unitary digital representation processing algorithm.

12. A computer-implemented method for producing, with at least one processor, the computing language software code and data parameters of an automated classifier of objects for authentication purposes, the method comprising:
obtaining a first set of object items for training the classifier;
obtaining a set of unitary digital representation processing algorithms and for each unitary digital representation processing algorithm, obtaining a set of configuration parameters representation processing algorithms suitable for parametrizing the execution of the digital representation processing algorithm;
acquiring, with at least one sensor, a plurality of digital signal representations of each object item in the first set, each of the plurality of digital signal representations being acquired for a predetermined object item position and orientation, for at least one predetermined sensor position and orientation, and for at least one predetermined physical environment parameter, such that the value of the physical environment parameter changes the digital signal representation of the object item at the predetermined object position and orientation and at the predetermined sensor position and orientation;
selecting, with the at least one processor, at least one unitary digital signal processing algorithm in the set of unitary digital representation processing algorithms, and configuring at least one parameter in the set of configuration parameters for the algorithm selected from the set of unitary digital representation processing algorithms, to produce an automated classifier to classify the digital representations of further objects as similar or different from the first set of object items, wherein the set of unitary digital representation processing algorithms comprises a deep convolutional neural network to classify images; and
producing, with the at least one processor, at least one set of neural network weights as a configuration parameter for the deep convolutional neural network unitary digital representation processing algorithm.

* * * * *